United States Patent [19]
Jacquemin et al.

[11] Patent Number: 5,975,617
[45] Date of Patent: Nov. 2, 1999

[54] SMALL BRACKET FOR SUN VISORS OF VEHICLES

[75] Inventors: Didier Jacquemin, Luxeuil les Bains; Christian Delus, St. Julien les Metz, both of France

[73] Assignee: Becker Group Europe GmbH, Wuppertal, Germany

[21] Appl. No.: 09/071,228

[22] Filed: May 1, 1998

[30] Foreign Application Priority Data

May 2, 1997 [DE] Germany .............................. 197 18 506

[51] Int. Cl.[6] .................................................. B60J 3/80
[52] U.S. Cl. ................................... 296/97.9; 248/289.11; 411/41
[58] Field of Search .............................. 296/97.9, 97.12, 296/97.1; 248/289.11; 411/41, 45, 46, 48, 182, 508, 509; 24/297

[56] References Cited

U.S. PATENT DOCUMENTS

| | | | |
|---|---|---|---|
| 4,312,614 | 1/1982 | Palmer et al. | 411/41 |
| 4,569,552 | 2/1986 | Marks | 248/289.11 |
| 4,756,570 | 7/1988 | Cooper | 248/289.11 |
| 4,804,303 | 2/1989 | Statkus | 411/41 |
| 4,874,276 | 10/1989 | Iguchi | 411/41 |
| 5,056,853 | 10/1991 | Van Order | 296/97.9 |
| 5,098,151 | 3/1992 | Peterson | 296/97.9 |
| 5,193,961 | 3/1993 | Hoyle et al. | 411/182 |
| 5,201,564 | 4/1993 | Price | 296/97.12 |
| 5,242,204 | 9/1993 | Kitterman | 296/97.9 |
| 5,286,152 | 2/1994 | Anderson | 411/41 |
| 5,314,227 | 5/1994 | Weiland et al. | 296/97.9 |
| 5,387,065 | 2/1995 | Sullivan | 411/45 |
| 5,468,041 | 11/1995 | Viertel et al. | |
| 5,499,854 | 3/1996 | Crotty, III et al. | 411/48 |
| 5,507,545 | 4/1996 | Krysiak | 296/97.9 |
| 5,593,262 | 1/1997 | Gedeon et al. | 411/182 |
| 5,662,375 | 9/1997 | Adams et al. | 296/214 |
| 5,746,559 | 5/1998 | Shirai | 411/182 |

FOREIGN PATENT DOCUMENTS

| | | |
|---|---|---|
| 43 26 660 | 2/1995 | Germany . |
| 44 42 133 C1 | 3/1996 | Germany . |

*Primary Examiner*—Joseph D. Pape
*Assistant Examiner*—Kiran Patel
*Attorney, Agent, or Firm*—Harness, Dickey & Pierce, P.L.C.

[57] ABSTRACT

A small bracket is provided for a sun visor for a vehicle. The bracket includes a base body supporting at least two locking elements and at least one seating dome, which can be mounted by means of locking elements. The locking elements can be inserted from the visible side into cutouts in the support structure behind whose cutout edges they extend. The bracket has a cover on the visible side, on which blocking wedges for securing the locking elements are arranged. Each locking element has two legs that can be brought into engagement transversely in respect to the insertion direction at oppositely located cutout edges. One leg of each locking element is arranged separated from the base body and movable in relation to it in the engagement direction. The bracket has an interlocking coupling that can be engaged in the engagement direction between the movable leg and the base body.

20 Claims, 1 Drawing Sheet

SMALL BRACKET FOR SUN VISORS OF VEHICLES

FIELD OF THE INVENTION

The invention relates to a small bracket for a vehicle sun visor, in particular for the screwless mounting of the sun visor shaft on a vehicle support structure, with a base body supporting at least two locking elements and at least one seating dome, which can be mounted by means of locking elements, which can be inserted into cutouts of the support structure behind whose cutout edges they extend, and with a cover on the visible side, on which blocking wedges for the locking elements, which are movable in relation to the locking elements, are arranged for securing the locking elements.

BACKGROUND OF THE INVENTION

In connection with a small bracket of this type, known from German Patent Publication DE-A43 26 660, each locking element, which is embodied with only one leg, extends behind a cutout edge of the support structure in order to fix the small bracket in place on the support structure. For additional securing, a blocking wedge is driven into the cutout of the support structure next to the locking element and is locked to the locking element, pushes it against the cutout edge around which it extends and itself rests flat against the other cutout edge, so that the locking element, when exposed to tensional loads opposite the insertion direction, cannot slide off the cutout edge around which it extends. It is simultaneously possible to fix a further accessory element (vehicle headliner or trim) in place on the support structure (body sheet metal piece with cutouts for the two locking elements and the seating dome) by means of the small bracket. Since in connection with a small bracket for a sun visor, considerable forces can act on the small bracket as a function of the movement resistance of the sun visor shaft or of the sun visor to the shaft, when it is in use, it is disadvantageous that the two locking elements provide support only on one side, are therefore locally put under high loads and possibly permit the lifting off of one side of the base body from the support structure, or respectively the accessory element. It is furthermore not useful that removal is difficult under some circumstances, because the lock of the blocking wedges on the locking elements can hardly be released without destroying them.

OBJECT AND SUMMARY OF THE INVENTION

It is therefore the object of the instant invention to create a small bracket of the type mentioned at the outset in such a way that, along with easy mounting and removal, secure seating, which is capable of bearing large loads, can be achieved.

The small bracket, in accordance with the invention, includes a base body supporting at least two locking elements, at least one seating dome, and a cover on the visible side of the base body, on which blocking wedges, which are movable in relation to the locking elements, are arranged for securing the locking elements. The base body can be mounted by means of the locking elements that can be inserted into the cutouts of the support structure. Each locking element has two legs that can be brought into engagement transversely in respect to the insertion direction at oppositely located cutout edges. One leg of each locking element is arranged to be movable in the engagement direction in relation to the base body. This movable leg is capable of being interlockingly coupled with the base body in such a way that the base body is secure against a movement opposite the insertion direction.

Each locking element provides support with both legs as soon as the mounting of the small bracket has been completed. Even high loads opposite the insertion direction are absorbed over a large surface and permanently, wherein lifting of the small bracket, or respectively the base body, on one side is hardly possible. The mobility, required for easy insertion and locking of each locking element, of at least the second leg of the locking element, and its structural separation from the base body, are no disadvantage for the load-bearing capability of the small bracket when completely mounted, since the base body is connected with the movable leg by means of the coupling in a manner which transfers tensile force and which is free of play when required. Because of this the base body is solidly anchored on the movable leg, which is supported on the vehicle structure anyway.

In another aspect of the invention, the blocking wedge can be driven between the two legs, and the coupling can be indirectly actuated by the blocking wedge in the engagement direction between the movable leg and the base body. The coupling is particularly easily actuated by means of the blocking wedge which secures the locking element on the support structure. Since the blocking wedge is not forced into its locked position by its contact with a cutout edge, but can be locked in a different, easily releasable manner on the base body, the small bracket can be removed without problems at any time.

In yet another aspect of the invention, the movable leg is resiliently connected with the other leg, and the coupling can be actuated in the release direction between the movable leg and the base body by the restoring force of the movable leg. Removal is made easier in that the movable leg automatically releases the coupling after the blocking wedge has been released. The pre-stressing of the movable leg in the release direction of the coupling has the further advantage that the blocking wedge must be firmly driven in, and that therefore it can be noticed whether the small bracket has been correctly secured.

In another embodiment, the coupling consists of engagement and counter-engagement elements respectively on the leg or the base body, which are movable in respect to each other relative to the engagement direction and extend behind each other opposite the insertion direction. The coupling is formed in a simple shape from cooperating elements, wherein in view of secure fixing in place it is advantageous that the release and engagement of the coupling takes place in the engagement direction of the movable leg, but the force transfer through the coupling opposite the insertion direction.

In a further embodiment, the engagement element comprises at least one hook projecting near the free end of the movable leg to the side facing away from the other leg, and the counter engagement element comprises at least one shoulder, undercut toward the visible side and arranged in the base body. The coupling is embodied as a simple structure and easily actuable.

In another aspect of the invention, at least one of the shoulder and the hook includes an inclined insertion surface effective in the engagement direction. The inclined tightening surface provides the possibility of tightening the base body in the direction toward the support structure by the action of the blocking wedge on the movable leg, or even to pre-stress it against it, by means of which a very solid seating, free of play, of the small bracket can be achieved.

In a further embodiment, the movable leg has at least one insertion ramp, which is oblique in the insertion direction and which terminates at a support shoulder. The movable leg is shaped in such a way that insertion into the cutout of the support structure can be performed with a reasonable amount of force and without damage.

In another embodiment, the support shoulder rises in the engagement direction, thereby assuring that the movable leg easily enters into the holding position and extends behind the cutout edge. Furthermore, a certain amount of compensation of production tolerances in the small bracket, or respectively the support structure, is provided because of the rise of the locking shoulder.

Easy handling during mounting and removal result in accordance with a further aspect of the invention. The cover, which includes the blocking wedges, is separate from the base body, and is adapted to be threaded on the sun visor shaft and locked on the base body. This separated embodiment furthermore can offer advantages in shaping.

Alternatively, in another aspect of the invention, the cover consists of two cover flaps, which are integrally formed with the base body and connected thereto via film hinges and leave open an insertion opening for the sun visor shaft, and wherein each cover flap supports a blocking wedge and can be locked on the base body. The cover is integrated in one piece into the small bracket. Handling during mounting becomes even easier because of this, since all required components are right at hand.

In another embodiment, the base body has contact surfaces, proximate the locking elements, and flanges, which are spaced apart from the contact surfaces and are distributed in the circumferential direction, for fixing a further accessory element, such as a headliner or trim, in place on the support structure. With this embodiment, large-area seating of the small bracket on the support structure is achieved wherein, if required, a further accessory element can also be fastened to the support structure together with the small bracket by means of the flange.

In a further embodiment, the cover has areas complementing the flanges of the base body for fixing the accessory element in place. The further accessory element is pressed against the support structure on all sides. In this manner, pleasant and decorative image of the small bracket in the finally mounted position is created.

In still another embodiment of the invention, the small bracket with or without the cover is a one-piece plastic injection-molded part, which can be mass-produced in large series in a cost-effective, dynamically balanced and exact-to-measure way.

In yet another embodiment, the cover is also a one-piece plastic injection-molded part suitable for mass production.

In a further embodiment, the sun visor shaft is already fixed in place in the seating dome prior to the mounting of the small bracket.

Preferred embodiments of the subject of the invention will be explained by means of the drawings and the detailed description that follow.

DETAILED DESCRIPTION OF THE PREFERRED EMBODIMENTS

Figure 1:
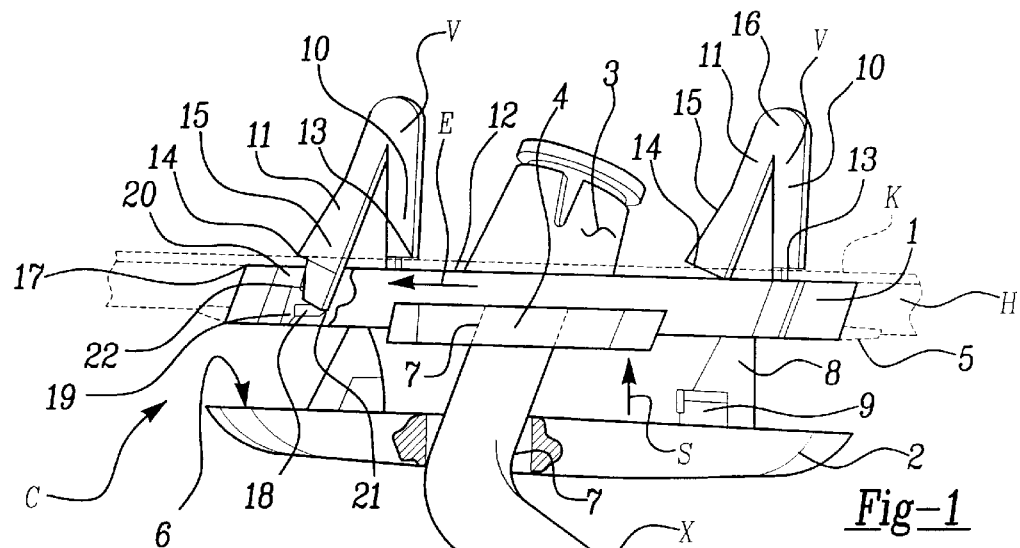
FIG. 1 is a side plan view, partially cut-away, of a first embodiment of a small bracket.

A small bracket B for fixing a shaft X, for example of a sun visor (not represented), in place and, if desired, a further accessory element H, for example a headliner or a trim plate, on a vehicle support structure K, typically the body sheet metal piece of a motor vehicle, consists of two one-piece plastic injection-molded elements. For mounting the small bracket B, the support structure K requires a hole pattern with, for example, two square cutouts and a round cutout located between them (not emphasized in detail).

A seating dome 3 and two locking elements V, which are arranged diametrically spaced apart from dome 3 and are embodied to be at least largely identical, are arranged on the back, facing away from the visible side, of a frame-shaped base body 1. Each locking element V consists of a leg 10, rigidly connected with the base body 1, which extends approximately vertically in respect to the main plane of the base body 1, and an obliquely descending leg 11 which has a free end section 17 and is connected with the leg 10 in a deformable connecting area 16. The two locking elements V are attached in the same direction to the base body 1, so that a leg 10 and a leg 11 are facing the seating dome 3. Each leg 10, 11 has at least one support shoulder 13, 14, which can extend behind one of two oppositely located cutout edges of the support structure K. An essentially flat contact surface 12 of the base body 1, having a wall thickness approximately the same as the thickness of support structure K, K is facing the support shoulder 13, 14, with which the base body 1 can be pressed against the underside of the support structure K. An oblique insertion ramp 15 is formed on the outside of each leg 11 which diverges toward the base body 1 in relation to the leg 10. The insides of both legs 10, 11 define a wedge-shaped clear space, to which open insertion openings 21 lead from the visible side of the base body 1. The free end section 17 of each leg 11 leads back as far as the insertion opening 21. A selectively engageable, or respectively releasable, interlocking coupling C is provided between the free end section 17 of each leg 11 and the base body 1 which, in the embodiment shown, consists of an engagement element 18, in the preferred embodiment engagement element 18 is a hook, projecting from the free end section 17, and a counter-engagement element 19, in the preferred embodiment counter-engagement element 19 is a pocket, open toward the visible side, with a support shoulder, formed in the base body 1. The engagement element 18 and/or the counter-engagement element 19 can be designed with an inclined tightening surface (for example 22 with the counter-engagement element 19), by means of which the contact surface 12 of the base body 1 can be pressed against the support structure K for engaging the coupling C in the engagement direction E of the leg 11 with the associated cutout edge of the support structure K. The support shoulders 14 on the legs 11 are suitably shaped in such a way that they obliquely rise in the engagement direction. The support shoulder, behind which the engagement element 18 of the coupling C can extend, is indicated by 20.

A plate-shaped cover 2 is a part of the small bracket B, on which blocking wedges 8, oriented toward the wedge-shaped free spaces between the legs 10, 11 of the locking elements V, as well as snap-in elements 9, which can be snapped into the base body 1, have been formed. The cover 2 can be threaded with a passage 7 on the shaft X. The base body 1, together with the locking elements V and the seating dome 3, can be inserted in the insertion direction S into the cutouts of the support structure K and can be locked therein. The cover 2 with the blocking wedges 8 and the snap-in elements 9 can also be inserted in the insertion direction S into the base body 1. Flanges 5, provided on the base body 1 if desired, and a flange element 4, formed on the visible side of the base body 1 and having an opening 7 for the shaft X, can be used, if desired, for pressing the further accessory element H against the support structure K after the final mounting of the small bracket B.

Some of the components explained in connection with FIG. 1 can be seen in a perspective top view on the rear of the base body 1 in FIG. 2. FIG. 2 shows in particular that the couplings C are designed similarly, but not identically, because the support shoulder 20' and the counter-engagement element 19' on the right side of the seating dome in FIG. 2 have a slightly different shape than the corresponding elements with the coupling C to the left of the seating dome 3.

Figure 2:
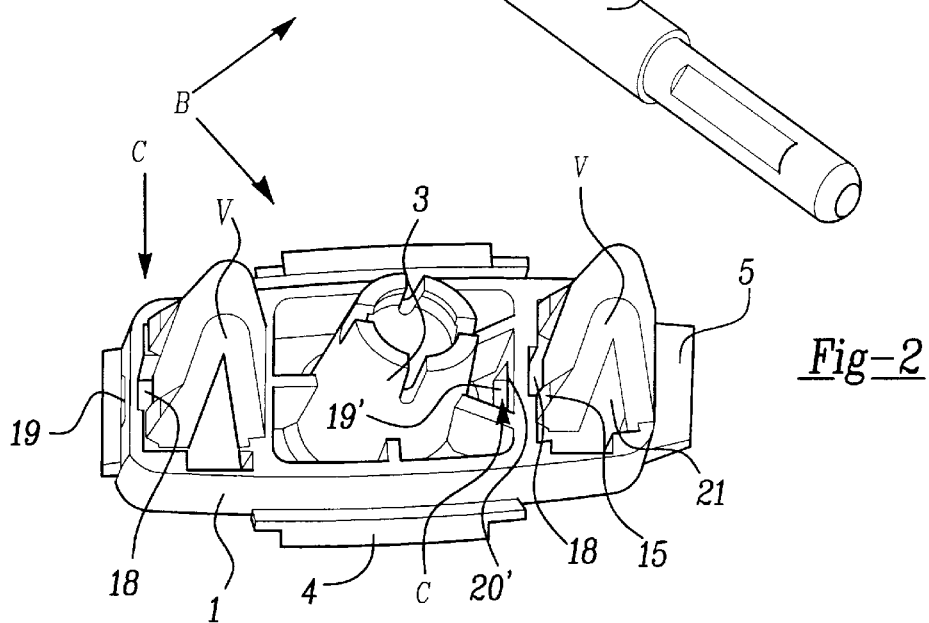
FIG. 2 is a perspective view in accordance with FIG. 1.

Prior to mounting, the base body 1 is inserted into a matching cutout of the accessory element H, wherein it can be pre-placed in the accessory element H in the position indicated in FIG. 1 either by means of appropriate seating or by auxiliary devices, not represented. Then the accessory element H, together with the possibly pre-placed base body 1, is pushed in the insertion direction S into the cutouts of the support structure K until the two oppositely located cutout edges of each cutout are engaged behind the two support shoulders 14, 13 of the legs 10, 11. Until the engagement of the support shoulders 14 the legs 11 are resiliently deformed in the direction toward the legs 10 (opposite the engagement direction E) by means of the inclined insertion ramps 15 and finally spring over the cutout edges with their support shoulder 14. The contact surface 12 rests against the support structure K. Thereafter, the cover 2 is displaced along the shaft X towards the base body 1 and the two blocking wedges 8 are inserted into the free spaces between the legs 10, 11. By means of the slant of the wedge of each blocking wedge 8 the associated leg 11 is spread open in relation to the other leg 10 and the support shoulders 13, 14 are secured on the cutout edges. During the movement of each free end section 17 taking place in the engagement direction E, the coupling C is simultaneously engaged by the engagement element 18 engaging the counter-engagement element 19 (or 19'). The engaged coupling C then provides a tension-resistant connection opposite the insertion direction S between the base body 1 and the leg 11, so that a load acting on the base body 1 opposite the insertion direction S is transmitted via the engaged coupling C and the end section 17 to the support shoulder 14 and by the latter directly to the support structure K. The cover 2 covers the visible side of the base body 1, is locked together with it and maintains the further accessory element H in place on the support structure K. The shaft X was already previously mounted in the base body 1, or respectively in its seating dome 3.

The small bracket B can be removed at any time. All that is required is to release the locking of the cover 2 and to pull out the blocking wedges 8. The legs 11 then spring back opposite to the engagement direction E and release the couplings C, if necessary aided by the use of a tool. Since there is free access to the counter-engagement elements 19, or respectively 19', from the visible side of the base body 1, the legs 11 can easily be released from engagement with their cutout edges before the support shoulders 13 also slide off their cutout edges because of the displacement of the base body 1 to the left in FIG. 1, so that finally the base body 1 can be pulled out of the cutouts.

In FIG. 1, the cover 2 is a separate plastic injection-molded part, which is associated with the base body 1. However, it would also be conceivable to embody the cover 2 from the start as one piece with the base body 1, perhaps in the manner shown in FIG. 3.

Figure 3:
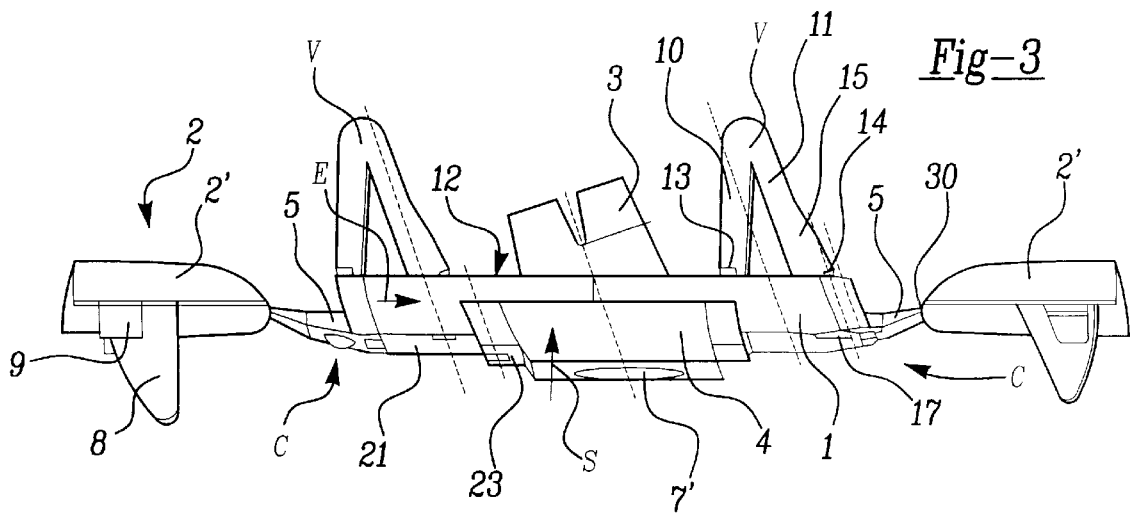
FIG. 3 is a side plan view of a further embodiment of a small bracket prior to mounting.

Film hinges 30 are provided in FIG. 3 on the flanges 5 of the base body 1, to which the halves 2' of the cover 2 are connected in one piece and can be flipped over. The cover halves 2' can be pivoted in the opposite direction out of the position shown and relative to the base body 1 until the blocking wedges 8 and the snap-in elements 9 dip into the insertion openings 21 of the base body in order to anchor the locking elements V on the cutout edges and to engage the couplings K. The cover halves 2' do not cover the visible side of the base body 1 over its entire length, but between them leave the flange element 4 with the opening 7' for the shaft X. In the locked state, the cover halves 2' suitably rest on supports 23 on the flange element 4 of the base body 1.

The arrangement of the two couplings K is such that one coupling points toward the seating dome 3, while the other coupling is located on the side facing away from the seating dome 3. This permits the easy handling of the base body 1 during assembly, or respectively removal, with a displacement in FIGS. 1 and 3 to the left, or respectively to the right, in order to bring the support shoulders 13, 14 into correct engagement with the cutout edges, or to release them from such engagement. The support shoulders 14, which rise obliquely in the engagement direction E, can generate a pulling effect on the cutout edges because of the engagement movement caused by the blocking wedges, or respectively they can compensate production tolerances of the small bracket in this area or of the vehicle support structure K.

In FIGS. 1 and 3 the engagement direction E extends approximately in the direction in which the locking elements V and the seating dome are arranged. It would be conceivable to dispose the locking elements V turned by 90° in respect to the positions shown in FIGS. 1 and 3 on the base body 1, so that the engagement direction extends perpendicularly in relation to the drawing plane. In this case it would be possible to select an arrangement wherein the two legs 11 point in the same direction, or alternatively in directions opposite each other. Since the cover 2 covers the visible side of the base body 1 anyway after mounting and is embodied hollow, the support shoulder 20 of the counter-engagement element 19, or respectively 19', could also be arranged directly on the visible side of the base body 1. In that case the engagement element 18 would at least slightly project past the visible side of the base body 1 as soon as the coupling K has been engaged. By means of this an easy access to the free end sections 17 of the two legs 11 would be possible for removing the small bracket B.

Of course, it should be understood that changes and modifications can be made to the preferred embodiments described above. It is therefore intended that the foregoing detailed description be regarded as illustrative rather than limiting, and that it be understood that it is the following claims, including all equivalents, which are intended to define the scope of this invention.

What is claimed is:

1. A small bracket for sun visors of vehicles for screwless mounting of the sun visor in cutouts on a vehicle support structure, the bracket comprising a base body supporting at least two locking elements, at least one seating dome, and a cover on the visible side of the base body, on which blocking wedges, which are movable in relation to the locking elements, are arranged for securing the locking elements, wherein the base body can be mounted by means of the locking elements that can be inserted into the cutouts of the support structure, and wherein each locking element has two legs that can be brought into engagement transversely in respect to the insertion direction at oppositely located cutout edges, one leg being arranged to be movable in the engagement direction in relation to the base body, the movable leg capable of being interlockingly coupled with the base body in such a way that the base body is secure against a movement opposite the insertion direction.

2. The small bracket in accordance with claim 1, wherein the blocking wedge can be driven between the two legs, and the coupling can be indirectly actuated by the blocking wedge in the engagement direction between the movable leg and the base body.

3. The small bracket in accordance with claim 1, wherein the movable leg is resiliently connected with the other leg, and the coupling can be actuated in the release direction between the movable leg and the base body by the restoring force of the movable leg.

4. The small bracket in accordance with claim 2, wherein the coupling consists of an engagement element on one of the two legs and the base body, and a counter-engagement element on the other of the two legs and the base body, the engagement element and the counter-engagement element being movable relative to each other in the engagement direction and extending behind each other in a direction opposite the insertion direction.

5. The small bracket in accordance with claim 4, wherein the engagement element comprises a hook projecting near the free end section of a first one of the two legs to the side facing away from a second of the two legs, and the counter-engagement element comprises at least one shoulder, the shoulder being undercut toward the visible side and arranged in the base body.

6. The small bracket in accordance with claim 5, wherein at least one of the shoulder and the hook includes an inclined insertion surface effective in the engagement direction.

7. The small bracket in accordance with claim 1, wherein the movable leg has at least one insertion ramp, which is oblique in the insertion direction and which terminates at a support shoulder.

8. The small bracket in accordance with claim 7, wherein the support shoulder rises in the engagement direction.

9. The small bracket in accordance with claim 1, wherein the cover, which includes the blocking wedges, is separate from the base body, and is adapted to be threaded on the sun visor shaft and locked on the base body.

10. The small bracket in accordance with claim 1, wherein the cover consists of two cover flaps, which are integrally formed with the base body and connected thereto via film hinges and leave open an insertion opening for the sun visor shaft, and wherein each cover flap supports a blocking wedge and can be locked on the base body.

11. The small bracket in accordance with claim 1, wherein the base body has a contact surface, proximate the locking elements, and one or more flanges spaced apart from the contact surface for fixing a further accessory element to the support structure.

12. The small bracket in accordance with claim 11, wherein the cover has areas complementing the flanges of the base body for fixing the accessory element in place.

13. The small bracket in accordance with claim 1, wherein the small bracket and the cover are a one-piece plastic injection-molded part.

14. The small bracket in accordance with claim 1, wherein the cover is a one-piece plastic injection-molded part.

15. The small bracket in accordance with claim 1 further comprising a shaft mounted in the seating dome.

16. A bracket for mounting without any screws a sun visor shaft into three or more cutouts of a vehicle support structure, said bracket comprising:

a base body having a contact surface and a visible surface, said contact surface supporting a first locking element insertable into the first cutout, a second locking element insertable into the second cutout, and a seating dome securable around the sun visor shaft and insertable into the third cutout, said first locking element having a first pair of leg members engagable with the first cutout, one of said first pair of leg members being movable relative to the other of said first pair of leg members, said second locking element having a second pair of leg members engagable with the second cutout, one of said second pair of leg members being movable relative to the other of said second pair of leg members; and a cover secured to said visible surface of said base body and having a first blocking wedge insertable between said first pair of leg members to prevent the relative movement of said first pair of said leg members, and a second blocking wedge insertable between said second pair of leg members to prevent the relative movement of said second pair of said leg members;

wherein the engagement of said first and second pairs of leg members into the first and second cutouts of the vehicle support structure, respectively, and the subsequent insertion of said first and second blocking members between said first and second pairs of leg members, respectively, mount the sun visor shaft to the vehicle support structure.

17. The bracket of claim 16, wherein said movable leg member of said first pair of leg members is biased towards the other of said first pair of leg members, and said movable leg member of said second pair of leg members is biased towards the other of said second pair of leg members.

18. The bracket of claim 16, wherein said movable leg member of said first pair of leg members and said movable leg member of said second pair of leg members face a similar direction.

19. The bracket of claim 16, further comprising a first counter-engagement element located on said base body, wherein said movable leg of said first pair of movable legs engages said first counter-engagement element upon the insertion of said first blocking wedge between said first pair of leg members; and a second counter-engagement element located on said base body, wherein said movable leg of said second pair of movable legs engages said second counter-engagement element upon the insertion of said second blocking wedge between said second pair of leg members.

20. The bracket of claim 16, wherein said cover is integrally formed with said base body.

* * * * *